Figure 1:
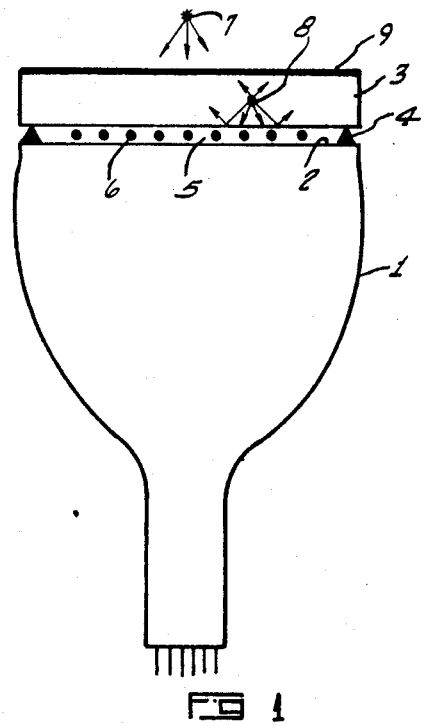

United States Patent

Suhami et al.

[11] 3,846,630
[45] Nov. 5, 1974

[54] METHOD FOR IDENTIFYING ELEMENTAL AREAS OF A PHOTOCATHODE

[76] Inventors: Avraham Suhami, 36 Oren St.; Benjamin Sabbah, 22 Hazalafin St.; Dan Inbar, 1080 Hanassi Blvd., all of Haifa; Arizi Yarom, 33 Hapalmach St., Jerusalem; Dan Ben-Zeev, 4 Hanesher St., Haifa, all of Israel

[22] Filed: Feb. 4, 1972

[21] Appl. No.: 223,617

Related U.S. Application Data

[62] Division of Ser. No. 1,198, Jan. 7, 1970.

[52] U.S. Cl.............................250/207, 250/351, 250/362, 250/369
[51] Int. Cl............................................. H01j 29/70
[58] Field of Search...250/172.5 S, 172.5 R, 213 VT; 315/21 R; 313/86 KM

[56] References Cited
UNITED STATES PATENTS

| | | |
|---|---|---|
| 3,354,314 | 11/1967 | Petroff et al. ............... 250/213 VT |
| 3,532,927 | 10/1970 | Hindel ............................ 250/71.5 S |
| 3,651,361 | 3/1972 | Tanaka et al. ................. 313/86 KM |
| 3,683,185 | 8/1972 | Muehllehner ................. 250/71.5 R |

Primary Examiner—Maynard Wilbur
Assistant Examiner—J. M. Potenza
Attorney, Agent, or Firm—Browdy and Neimark

[57] ABSTRACT

The invention relates to phototubes and in particular to photo multiplier tubes such as those associated with scintillation crystals and which are provided with an array of conductor elements juxtaposed with respect to the photo cathode of the tube and which when subjected to voltage pulsing in a scanning sequence are capable of providing information concerning the spatial distribution of light incident on the photo cathode.

5 Claims, 8 Drawing Figures

METHOD FOR IDENTIFYING ELEMENTAL AREAS OF A PHOTOCATHODE

This is a division of application Ser. No. 1,198 filed Jan. 7, 1970.

This invention relates to photo tubes and in particular to photo multiplier tubes such as photo multiplier tubes associated with scintillation crystals. Photo tubes act as light detectors and convert a light input, incident on a photo cathode into an electrical output. This electrical output is a function of the light intensity incident on the photo cathode and is independent of the spatial distribution of the light on the cathode. Where information is required concerning this spatial distribution, involved and elaborate steps have to be adopted in order to secure such information.

Thus, for example, a photo multiplier is used in conjunction with a scintillator crystal to form a scintillator counter capable of detecting radiation such as gamma or X-rays. Whenever, a gamma ray, for example, is absorbed by the scintillator crystal a current pulse is derived from the photo multiplier having an intensity corresponding to the energy of the ray absorbed and having a decay time which is characteristic of the scintillator. No information is, however, obtained as to the precise position at which the gamma ray impinged on and interacted with the scintillator. Where it is desired to obtain information concerning the spatial distribution of the impinging radiation the region must either be scanned by the counter or a multi-counter arrangement must be used so as to derive the information simultaneously. It will be readily appreciated that whereas the first of these alternatives is very time consuming the second alternative involves the provision of relatively elaborate equipment.

On the other hand in the use of a photo multiplier tube as a television camera the object to be televised is imaged on the photo cathode and raster scanning by an electron beam is employed in order to obtain information concerning the spatial distribution of the photo electrons emitted from the photo cathode. Such an arrangement also involves the use of complicated equipment.

It is the object of the present invention to provide a method by which a phototube can be used to obtain information concerning the spatial distribution of light radiation incident on its photo cathode.

According to the present invention there is provided a photo tube assembly comprising in combination a photo tube and an array of conductive elements juxtaposed with respect to the photo cathode of the photo tube.

It is widely known, from the literature that external electrostatic and/or electromagnetic fields may divert photoelectrons from their original path thus reducing the output current of a photomultiplier.

The present invention makes use of this known phenomenon in that the photo cathode is associated with an entire array of conductive elements to which voltage pulses can be selectively applied. After the occurrence of a light event (which can be detected by the use of a current pulse emitted from the photo tube) the entire surface of the photo cathode can be effectively scanned by applying voltage pulses to the constituent elements of the array in accordance with an appropriate sequence. In this way the particular conductive element closest to the location of the light event can be identified seeing that as a result of the application of voltage pulse to this particular element a maximum interference with the emitted current pulse can be observed.

Preferably, the assembly forms part of a scintillation counter in which case the photo tube which is, in fact, a photo multiplier tube is associated with a scintillator crystal, means being provided for ensuring that, as far as possible, any particular light event whose spatial location is to be identified is effectively isolated from any other simultaneously occurring light event thereby ensuring that the current pulse emitted by the photo multiplier is associated with only a single light event.

Preferably the photo tube assembly is formed as a single integral unit with the array of conductive elements embedded in the optical front end window of the photo multiplier directly adjacent the photo cathode.

In accordance with a preferred embodiment the constituent elements of the array are respectively constituted by the cross over regions of pairs of crossed, mutually insulated conductors which together form a lattice juxtaposed with respect to the photo cathode.

Figure 2:
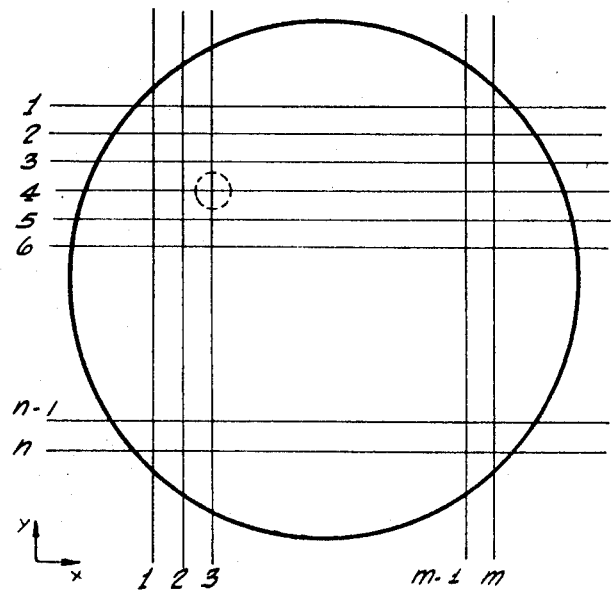
Figure 3A:
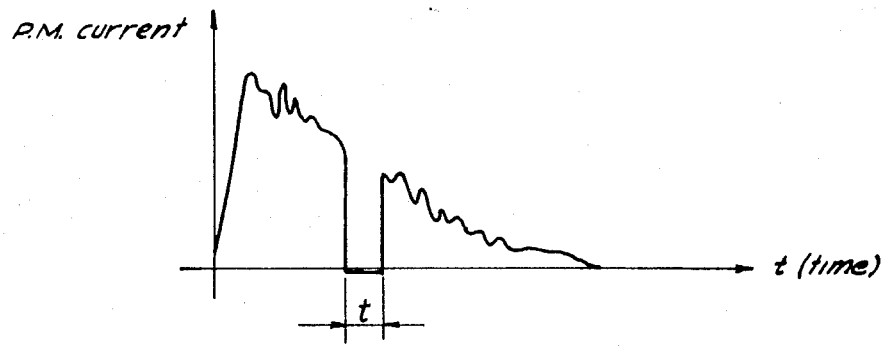
Figure 3B:
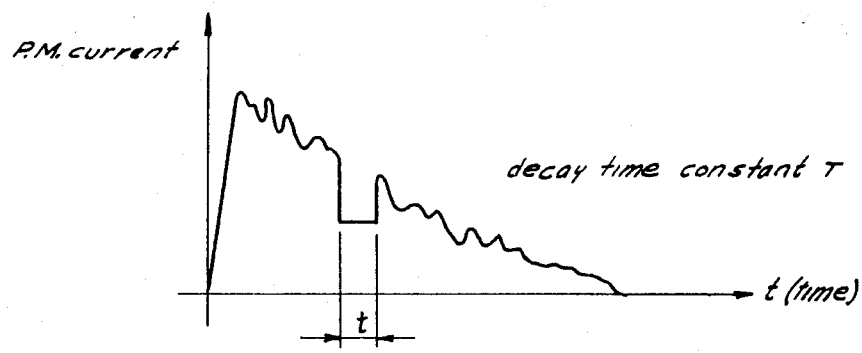
Figure 4:
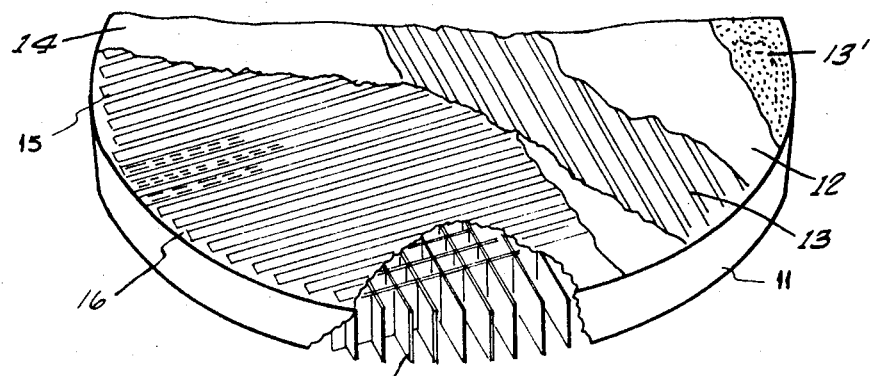
Figure 5:
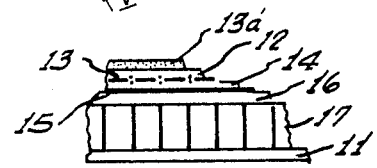
Figure 6:
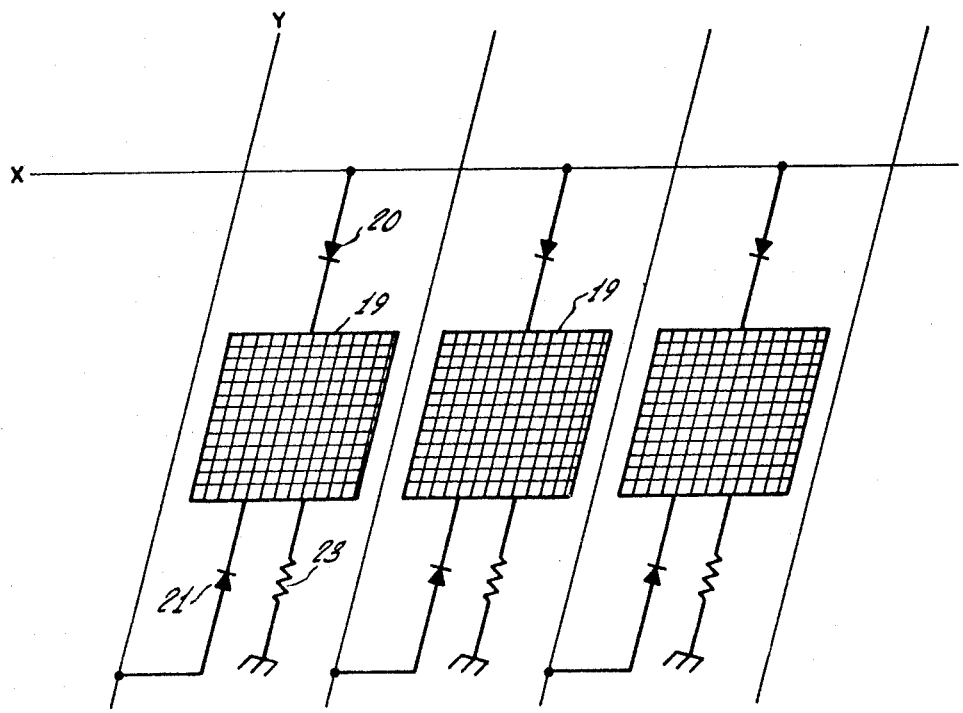
Figure 7:
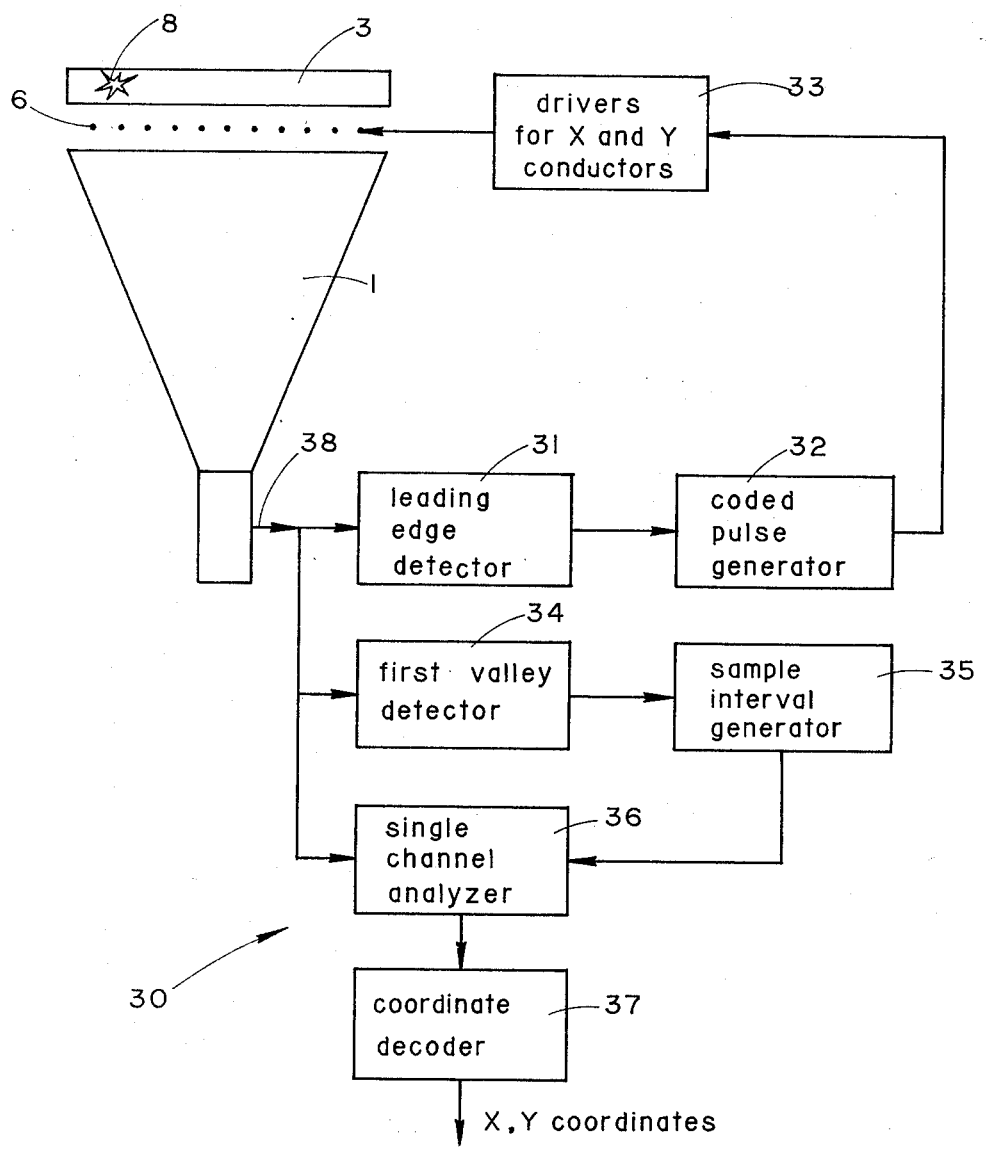

For a better understanding of the present invention and to shown how the same can be carried out in practice reference will now be made to the accompanying drawings, in which:

FIG. 1 is a schematic representation of a scintillation counter incorporating a photo multiplier assembly in accordance with the present invention, FIG. 2 is a schematic plan view of the photo multiplier assembly shown in FIG. 1, FIGS. 3a and 3b are curves showing the variation of photo-multiplier current with time with a photo multiplier assembly in accordance with the present invention in respect of a single light event and in connection with which scanning voltage pulses are applied respectively to adjoining wires of the matrix, FIG. 4 is a partially cutaway perspective view of a front end window of a photo multiplier tube incorporating a photo cathode and a wire lattice in accordance with the present invention, FIG. 5 is a cross sectional view of a portion of the window shown in FIG. 4, FIG. 6 is a schematic view of a modified form of an array of conductive elements forming part of a photo multiplier assembly in accordance with the invention, and FIG. 7 is a block diagram of an electronic circuit capable of carrying out the invention.

As seen in FIG. 1 of the drawings a scintillator counter comprises a photo multiplier 1 having a front end window 2 on which is formed a photo cathode (not seen). A scintillator crystal 3 is located opposite the front end window 2 of the photo multiplier 1 and is separated therefrom by spacer supports 4, an air gap 5 being defined between opposite faces of the scintillator crystal 3 and the front end window 2. Located in this air gap 5 is a matrix 6 of $m \times n$ crossed, mutually insulated wires ($m$ wires in the $x$ direction and $n$ wires in the $y$ direction). Radiation 7 impinges on the scintillator crystal 3 each particular impinging radiation event giving rise to a corresponding light event 8. The presence of the air gap 5 between the scintillator crystal 3 and the end window 2 has as a consequence that only light rays originating in a light event 8 and located within a cone of aperture corresponding to the critical angle will traverse the air gap and strike the photo cathode of the photo multiplier. All the remaining light rays originating from that light event will be reflected at the surface of the scintillator crystal and upon impinging at the other surface thereof are absorbed on a light absorber layer 9. In this way it is ensured that, for any single light event 8 which corresponds to a single ray of impinging radiation only one localized cone of light will be formed and will be received by the photo cathode. Thus, if for example, the relevant critical angle is 40° and the thickness of the scintillator crystal is $d$ then the diameter of the light cone striking the photo cathode will be of the order of $2d$. Thus, with a crystal of one quarter inch in width, a half inch diameter light circle will be obtained on the photo cathode and this area (of the order of $2d$) can be defined as being a resolution element or elemental area. It is a reasonable approximation to assume that with an assembly as schematically shown in FIG. 1, all rays which are simultaneously incident on a specified resolution element on a photo cathode originate in a specified light event located directly opposite that resolution element.

If reference is now made to FIG. 2 of the drawings, we can see that the wire lattice is so arranged that the intersection of each pair of crossing wires can be considered to be associated with a specific resolution element of the photocathode and that effectively the electric field which is developed as a result of the application of an electric voltage to this pair of crossing wires is sufficiently intense over this entire resolution element as to interfere with the normal path of photoelectrons emitted from this resolution element to the dynode.

Thus, if upon the occurrence of a light event and the incidence of the light thereby produced on a specific resolution element of the photo cathode the application of a positive voltage pulse of width $t$ to one of the wires of the matrix located opposite the resolution element will have the result that the photo electrons emitted from that resolution element will be prevented from reaching the first dynode for a period of time $t$. FIG. 3a shows graphically a current pulse obtained from the photo multiplier of a scintillation counter as a result of the occurrence of a scintillation event with a decay time $\tau$ when a voltage pulse of the width $t$ ($T < \tau$) is applied to one of the wires of the lattice located adjacent the resolution element of the photo cathode and directly opposite the location of the scintillation event.

As can be seen, the application of the voltage pulse to this wire diverts the current for the period of time $t$ so that a valley is produced in the representation of the photo multiplier output current pulse. When, as shown in FIG. 3b of the drawings the positive voltage pulse is applied to a wire adjacent a resolution element which neighbours but is not directly opposite the location of the scintillation event a valley will be produced which is of much lesser depth than the valley shown in FIG. 3b. Similarly, where the voltage pulse is applied to a wire still further removed from the location of the scintillation event no valley whatsoever will be observed.

It will become apparent therefore that in order to establish the precise location of a scintillation event the photo cathode must be scanned by the application of voltage pulses to all the wires of the lattice in an appropriate sequence so as to determine the identity of the pair of crossing wires whose intersection is located opposite the location of the scintillation event and which, when voltage pulses are applied thereto, cause the production of valleys of maximum depth in the photo multiplier current output pulse.

The particular scanning sequence which is adopted is dictated by the fact that scanning has to be completed well within the normal decay time of a scintillation event. With this end in view a so-called successive approximation scanning sequence is adopted. Scanning these elements by successive approximations involves starting with the entire area and dividing this area in two parts for every scanning step.

Consider the provision of a lattice having $2^p$ code grids in the $x$ direction (i.e., $2^p$ conductors spaced along the $x$ direction) and $2^q$ code grids in the $y$ direction (i.e., $2^q$ conductors spaced along the $y$ direction). Thus $p$ and $q$ are respectively the powers to which 2 must be raised to obtain the number of conductors in the $x$ and $y$ directions repsectively. Where, as in the example shown the lattice is made of 32 wires in the $x$ direction and 32 wires in the $y$ direction $p$ and $q$ are both equal to 5.

The pulsing sequence of the lattice will consist of $p + q$ pulses applied in steps $m_1 \ldots m_p \ldots m_q$. Thus, if $m_p$ is the pulsing step number all the grids in the $x$ direction from $[(2^{p-m}p)(n-1)]+1$ to $(2^{p-m}p)n$ where $n = 1,3,5 \ldots (2^m p - 1)$ will be triggered at each step until $m_p = p$. After that all the grids in the $y$ direction will be triggered according to the same sequence from $[(2^{q-m}q)(n-1)] + 1$ to $(2^{8-m}q)n$ where $n = 1,3,5 \ldots (2^m q - 1)$ at each step until $m_q = q$.

In the particular example given $$p = q = 5 \text{ and } 2^p = 2^q = 32$$

| | | | |
|---|---|---|---|
| for: $m_p = 1$ | $n=1$ | all $p$ wires from | 1 to 16 will be triggered |
| for: $m_p = 2$ | ($n=1$ | do. | 1 to 8 |
| | ($n=3$ | do. | 17 to 24 will be triggered |
| for: $m_p = 3$ | ($n=1$ | do. | 1 to 4 |
| | ($n=3$ | do. | 9 to 12 will be triggered |
| | ($n=5$ | do. | 17 to 20 |
| | ($n=7$ | do. | 25 to 28 |
| for: $m_p = 4$ | ($n=1$ | do. | 1 to 2 |
| | ($n=3$ | do. | 5 to 6 |
| | ($n=5$ | do. | 9 to 10 |
| | ($n=7$ | do. | 13 to 14 will be triggered |
| | ($n=9$ | do. | 17 to 18 |
| | ($n=11$ | do. | 21 to 22 |
| | ($n=13$ | do. | 25 to 26 |
| | ($n=15$ | do. | 29 to 30 |
| for: $m_p = 5$ | $n=1,3,5 \ldots 31$ | all $p$ wires $1,3,5 \ldots 31$ will be triggered | |

After the five "$p$" steps, the five "$q$" steps will trigger consecutively the $q$ wires according to the same sequence.

The sequence of voltage pulse to be applied to the wires of the lattice is initiated by the rise time of a scintillation pulse reaching the anode of the photo multiplier as indicated in the block diagram of FIG. 7 to which reference is now made. Circuit 30 may be utilized for the purpose of controlling the scanning of the grid of wires 6 and providing the coordinates, x and y, of a light event 8 occurring in crystal 3 associated with phototube 1. When a light event occurs the resultant photons falling on an elemental area of the photocathode of the tube will cause emission of photoelectrons which eventually reach the anode electrode 38 of the tube causing a rapid rise in the current at that electrode. This rapid rise in current constitutes the leading edge of the output of the phototube as shown by the sharply rising curves in FIGS. 3a and 3b, and the existence of this edge is sensed by leading edge detector 31. Thus, the output of detector 31 will be a trigger pulse delayed in time subsequent to the light event by the transit time $\tau$ of the phototube. The transit time for photo electrons coming from the photo cathode and passing to the anode depends on the location of the point of origin of the photo electrons, this transit time being different for photo electrons coming from different parts of the photo cathode. In order to ensure that the sequence observations to be made are not influenced by these transit times, circuit 30 operates to cause an initial valley to appear in the output of the anode, such valley establishing a reference to which the interrogation pulses applied to the grid 6 and resultant valleys in the output of the anode can be referred. Thus, the trigger pulse produced by detector 31 causes the coded pulse generator 32 to apply a predetermined pattern of pulses to the grid, which pattern may be that set forth above. Upon receipt of the trigger pulse, generator 32 applies a positive voltage pulse to all of the wires running in one direction, for example, all of the x wires. Seeing that a scintillation has occurred photo electrons are emitted by one of the resolution elements of the photo cathode and seeing that all the resolution elements are covered by the x wires the application of pulses to all the x wires must result in the appearance of a valley. The precise instant in time when this valley appears depends, of course, on the transit time of the photo electrons to the anode which, in its turn, is dependent, inter alia, on the location of the specific resolution element from which electrons are emitted. The appearance of this first valley will therefore serve as a time reference for all the subsequent valleys to be detected as a result of the application of subsequent scanning pulses in the successive approximation sequence. Thus, with the appearance of the first valley the application of the subsequent scanning pulses is initiated and, in the particular example of a 32 × 32 lattice, the second pulse is applied to the first 16 wires, the third pulse is applied to wires 1 to 8 and 17 to 24 and so on in accordance with the sequence. The sequence proceeds and is completed with the application of the eleventh pulse, this pulse being applied to y wires having odd number designations.

The position of the successive valleys is calculated with reference to the position of the first valley which is always obtained as a result of applying pulses to all the x wires. The first valley is detected by detector 34 which triggers the operation of sample interval generator 35 controlling the linear gating of the anode signal into single channel analyzer 36. The frequency at which the sample intervals are developed by generator 35 is the same as the frequency at which sets of pulses are applied to the grid 6. Hence, the anode signal will be gated into analyzer 36 each time there is a possibility that a valley may occur due to the pulsing of grid 6. The presence or absence of a deep valley in the various time slots established by generator 35 can thus be ascertained to identify the x wire and the y wire closest to the light event. The coordinates of the light event are thus attained by decoding in decoder 37 the output of analyzer 36. In order to ensure the highest possible sensitivity in detection area discrimination is employed (not pulse height discrimination) seeing that such a technique enables adequate differentiation between real valleys and mere statistical fluctuations. Area discrimination technique involves the integration of the entire valley area and discrimination on the basis of total charge. In view of the fact that, as can be seen in FIGS. 3a and 3b of the drawings, the total current pulse height decreases with a time constant which corresponds to the decay constant of the scintillation event, in order to ensure that consecutive valleys should have the same absolute area, (so as to allow for the carrying out of area discrimination), the width of the successive pulse to be applied to the successive wires of the lattice must be varied. Discrimination will therefore always have to be triggered at the same level thus avoiding the different statistical considerations at different level.

In order to carry out energy discrimination on the photo multiplier current pulse only those portions of the pulse on either side of the valley can be considered. For this purpose the pulse is divided into three portions, namely, the front, the middle (the coded valley portion) and the tail. Only the front and tail portions are used for energy discrimination. In order to enhance the position determining action of the voltage pulses as applied to the lattice wires each lattice wire can be associated with a pair of adjacent wires which can be earthed or or so biased as to enhance the appearance of valleys and shield from side interference.

It will be understood that in order to ensure that the applied voltage pulses are effective in preventing or delaying the passage of photo electrons from the photo cathode to the dynode the wire lattice should be located as close as possible to the photo cathode.

In the specific embodiment of a scintillator counter described above the means adopted for ensuring that only the light originating in a single scintillation event reaches a specified resolution element of the photo cathode involves the spacing of the single scintillator crystal from the photo cathode with an air gap located between them. This arrangement is effective in the detection of relatively high energy incident radiation. In an alternative arrangement which is designed for use in the detection of relatively low energy radiation the single scintillator crystal is replaced by a matrix of scintillator crystals which are located on the end window of the photo multiplier with no air gap therebetween. The construction of the matrix of crystals ensures that only a single scintillation effect can take place in a single crystal and that the light emanating from the single crystal reaches only a single resolution element.

In accordance with a preferred embodiment the wire lattice is incorporated in the end window of the photo multiplier tube, the photo multiplier assembly in accordance with the invention being constructed as an integral whole. Such an arrangement is shown in FIGS. 4 and 5 of the accompanying drawings which show the construction of the photo multiplier and window. The window consists of outer and inner glass layers 11 and 12. Deposited on the inner glass layer 12 is a photo cathode layer 13a. Sandwiched between the glass layers 12 and 11 are to be found the following layers, proceeding in order from the inner layer 12 to the outer layer 11, namely:

a layer of crosswise conductive strips 13 formed of metal mesh.

a glass layer 14.

a layer of lengthwise conductive strips 15 made of metal mesh.

a glass layer 16, and a reflecting matrix 17 formed of a honeycomb metal structure.

In this embodiment the crosswise and lengthwise metal strips 13 and 15 constitute the conductive lattice in accordance with the invention whilst the reflecting matrix 17 is provided in order to ensure that the light entering the end window does not diffuse through the window but is optically piped from one end of the window to the other.

Alternatively any other light piping arrangement can be employed such as, for example, critical angle piping.

In order to reduce, in an embodiment such as that just described with reference to FIGS. 4 and 5 of the drawings, the electrostatic shielding effect of the set of $x$ wires (between the photocathode and the set of $y$ wires) various alternative measures can be adopted. Thus, the $x$ wires can be isolated from earth by electronic switching during the period that pulsing of the $y$ wires takes place.

In an alternative embodiment shown schematically in FIG. 6 the juxtaposed lattice of conductors is replaced by an array of conductive mesh elements 19 which is juxtaposed with respect to the photocathode in such a manner that each resolution element (as hereinbefore defined) of the photocathode is covered by a mesh element 19. Each mesh element is connected to a pair of $x$ and $y$ wires (possibly located externally to the voltage pulse sources) via diodes 20 and 21 which prevent current flow between the $x$ and $y$ wires via the mesh elements 19. Each element 19 is coupled to earth via a resistance 22.

Whilst all the applications of the photo tube assembly in accordance with this invention specifically described above have been in connection with scintillator counters, it will be readily appreciated that such a tube and in particular photo multiplier assemblies, in accordance with the invention, can be adapted for other uses. Thus, a photo multiplier assembly, in accordance with the present invention can be used, for example, in a television camera wherein a picture can be optically projected onto the photo cathode and the conductive lattice can be employed to effect scanning of the photo cathode surface and thus to modulate the electric output of the camera. The picture can then be reconstructed from the modulated signal.

We claim:

1. A method of sampling the anode voltage of a photomultiplier tube for identifying the elemental area of its photocathode illuminated by a light event comprising:

a. providing a grid of electrically separate conductors adjacent the photocathode comprising a group of $x$ conductors that cross a group of $y$ conductors wherein:

$2^{(p-1)} < x \leq 2^p$ and
$2^{(q-1)} < y \leq 2^q$ where $p$ and $q$ are integers, and the projection of the crossing of a pair of conductors on the photocathode defines the centre of an elemental area thereon;

b. sequentially applying to the conductors, within the decay time $\tau$ of the anode voltage resulting from the occurrence of a light event, $(p + q)$ sets of retarding pulses, each set comprising pulses are applied simultaneously to selected ones of the conductors, for producing in the anode voltage, valleys whose location and depth depend on the spatial location of the elemental area illuminated by the light event and the sequence in which the sets of retarding pulses are applied; and c. sampling the amplitude of the anode voltage at the same rate at which the sets of retarding pulses areapplied to the conductors.

2. A method according to claim 1, wherein before the $(p + q)$ sets of retarding pulses are applied, an initial set of retarding pulses is applied simultaneously to all of the conductors of at least one group in response to detection of a rise in the anode voltage resulting from the occurrence of a light event for producing in the anode voltage an initial valley whose occurrence, relative to said rise in the anode voltage, depends on the transit time of the tube, and wherein the sampling of the anode voltage occurs in response to the detection therein of the initial valley.

3. A method according to claim 2, wherein the anode voltage is integrated during the sampling interval for distinguishing between statistical fluctuations in the anode voltage and real valleys therein.

4. A method according to claim 2, wherein the duration of the sampling interval increases as the number of sampling intervals increases for compensating for the decrease in the amplitude of the anode voltage as a function of the decay time $\tau$.

5. A method according to claim 2 wherein the conductors of the $m_p$th set of retarding pulses applied to the $x$-conductors where $m_p = 1, 2 \ldots p$ are identified as follows:

$(2^{p-m_p})(n-1) + 1$ to $(2^{p-m_p})n$ where $n = 1, 3, 5, \ldots (2^{m_p} - 1)$ and the conductors of the $m_q{}^{th}$ set of retarding pulses applied to the $y$ conductors, wherein $m_q = 1, 2 \ldots q$ are identified as follows:

$(2^{q-m_q})(n-mq1) + 1$ to $(2^{q-m_q}) n$
where $n = 1, 3, 5, \ldots (2^{m_q}-1)$.

* * * * *